(12) United States Patent
Chavez et al.

(10) Patent No.: US 6,687,749 B1
(45) Date of Patent: Feb. 3, 2004

(54) METHODS AND SYSTEMS FOR REPORTING AND RESOLVING SUPPORT INCIDENTS

(75) Inventors: Anthony Chavez, Bothell, WA (US); Daniel Li, Redmond, WA (US); Davide Massarenti, Redmond, WA (US); Michael E. Meulemans, Renton, WA (US); Sridhar Chandrashekar, Redmond, WA (US); Ghim-Sim Chua, Redmond, WA (US); Avronil Bhattacharjee, Bellevue, WA (US); Pierre Jacomet, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 684 days.

(21) Appl. No.: 09/607,366

(22) Filed: Jun. 30, 2000

Related U.S. Application Data (60) Provisional application No. 60/141,757, filed on Jun. 30, 1999.

(51) Int. Cl.[7] .............................................. G06F 15/173
(52) U.S. Cl. ...................... 709/223; 709/202; 709/224; 709/227; 370/216; 370/242; 370/247
(58) Field of Search ................................ 709/200–202, 709/223–224, 227–228, 251; 370/216, 242–249; 707/202, 204

(56) References Cited

U.S. PATENT DOCUMENTS

| | | | |
|---|---|---|---|
| 5,276,860 A | | 1/1994 | Fortier |
| 5,367,667 A | | 11/1994 | Matson et al. |
| 5,524,190 A | | 6/1996 | Schaeffer et al. |
| 5,715,462 A | | 2/1998 | Iwamoto et al. .................... 1/1 |
| 5,944,798 A | * | 8/1999 | McCarty et al. ............. 709/251 |
| 6,014,715 A | * | 1/2000 | Stoevhase .................... 709/227 |
| 6,115,361 A | * | 9/2000 | Fredericks et al. .......... 370/242 |
| 6,370,573 B1 | * | 4/2002 | Bowman-Amuah ......... 709/223 |
| 6,473,794 B1 | * | 10/2002 | Guheen et al. ............. 709/223 |

FOREIGN PATENT DOCUMENTS

| | | |
|---|---|---|
| EP | 0625752 | 11/1994 |
| GB | 2329046 | 3/1999 |
| WO | 9912101 | 3/1999 |

OTHER PUBLICATIONS

Netscape Communications Corporation: "NetHelp 2.0 Authoring Guide" Nethelp 2.0 SDK Documentation, 'Online! Sep. 3, 1997, pp. 1–21, XP002155041.

C. Levin: "Web Repair Shops" PC Magazine: Trends Online, 'Online! Aug. 11, 1998, pp. 1–3, XP002155042.

Netscape Communications Corporation: "Establishing trust for downloaded software" Netscape Object Signing, 'Online! Jul. 2, 1997, pp. 1–18, XP002155043.

Netscape Communications Corporation: "SmartUpdate Developer's Guide" Devedge Online Documentation, 'Online! Mar. 11, 1999, pp. 1–83, XP002155044.

R. Binns, J. Winstead: "A standard for Linux packages and version numbering" Linux Specification Document, 'Online! Aug. 24, 1993, XP002155045.

(List continued on next page.)

Primary Examiner—Bharat Barot
(74) Attorney, Agent, or Firm—Leydig, Voit & Mayer, Ltd.

(57) ABSTRACT

The present invention manages information about support incidents on a computer. The invention gathers information about a support incident, associates the support incident with a support channel, and collects current and historical information from the computer. Implementations of the invention may also package and send the gathered and collected information to a support vendor. The invention comprises methods of performing these tasks, systems that perform them, computer-readable media that contain computer-executable instructions that when executed perform the methods or provide the systems, and data structures stored on computer-readable media having fields that represent software objects useful in performing the methods or providing the systems.

25 Claims, 5 Drawing Sheets

OTHER PUBLICATIONS

"Safe Installation of Object–Oriented Class Libraries Common to multiple Software Products" IBM Technical Disclosure Bulletin, US, IBM Corp. New York, vol. 37, No. 2B, Feb. 1, 1994, pp. 407–409.

Collinson: "Putting old software back together again" EXE vol. 13, No. 6, Nov. 1998 pp. 45–48.

Iffland et al: "ISDN Applications: Their Identification and Development" IEEE Network: The Magazine of Computer Communications, US, IEEE INC New York, vol. 3, No. 6, Sep. 1, 1989 pp. 6–11.

* cited by examiner

```
<?xml version = "1.0">
    <DataSpec GUID = "47DE97C8-F86B-11D2-9628-00C04F68F2AF">
        <WQL Namespace = "root / cimv2" Class = "Win32_NetworkClient">
502         select * from Win32_NetworkClient
        </WQL>
        <WQL Namespace = "root / pchealth" Class = "PCH_FileUpLoad">
504         select * from PCH_FileUpLoad where path = "%windir% \\ win.ini"
        </WQL>
        <WQL Namespace = "root / Vendor" Class = "Vendor_SomeNewWMIProvider">
506         select * from Vendor_SomeNewWMIProvider
        </WQL>
    </DataSpec>
```

FIG. 6

METHODS AND SYSTEMS FOR REPORTING AND RESOLVING SUPPORT INCIDENTS

CROSS REFERENCE TO RELATED APPLICATIONS

This application claims the benefit of provisional patent application No. 60/141,757, filed Jun. 30, 1999.

TECHNICAL FIELD

This invention relates generally to computer support, and, more specifically, to services for reporting and resolving support incidents.

BACKGROUND OF THE INVENTION

When a computer user calls on technical support for help with a problem, a support specialist tries to develop an understanding of the problem by collecting from the user information stored on the computer. Unfortunately, this information collection process is tedious and prone to error. Users are generally unsure about how to gather the information. The information on the computer may be difficult to find, difficult to interpret, and difficult to recount accurately to the support specialist. Some information pertinent to the problem, such as historical information, may simply not be available. Once the information has been provided, the support specialist interprets it and then tries to guide the user through steps to fix the problem. The fixing process is beset with the same problems as the information collection process, however. In addition, if the problem is not immediately and completely fixed, or if the problem reappears in a different context, the user may have to call back and go through the whole process again. These difficulties frustrate everyone involved, vastly increase the cost of providing technical support, and hinder the user from getting the most out of his or her computer.

SUMMARY OF THE INVENTION

The present invention manages information about support incidents on a computer. The invention gathers information about a support incident, associates the support incident with a support channel, and collects current and historical information from the computer. Implementations of the invention may also package and send the gathered and collected information to a support vendor. The invention comprises methods of performing these tasks, systems that perform them, computer-readable media that contain computer-executable instructions that when executed perform the methods or provide the systems, and data structures stored on computer-readable media having fields that represent software objects useful in performing the methods or providing the systems.

BRIEF DESCRIPTION OF THE DRAWINGS

The present invention may best be understood from the following detailed description taken in conjunction with the accompanying drawings of which.

DETAILED DESCRIPTION OF THE INVENTION

Turning to the drawings, wherein like reference numerals refer to like elements, the invention is illustrated as being implemented in a suitable computing environment. The following description is based on possible embodiments of the invention and should not be taken as limiting the invention in any way.

Overview of a General-Purpose Computer

Figure 1:
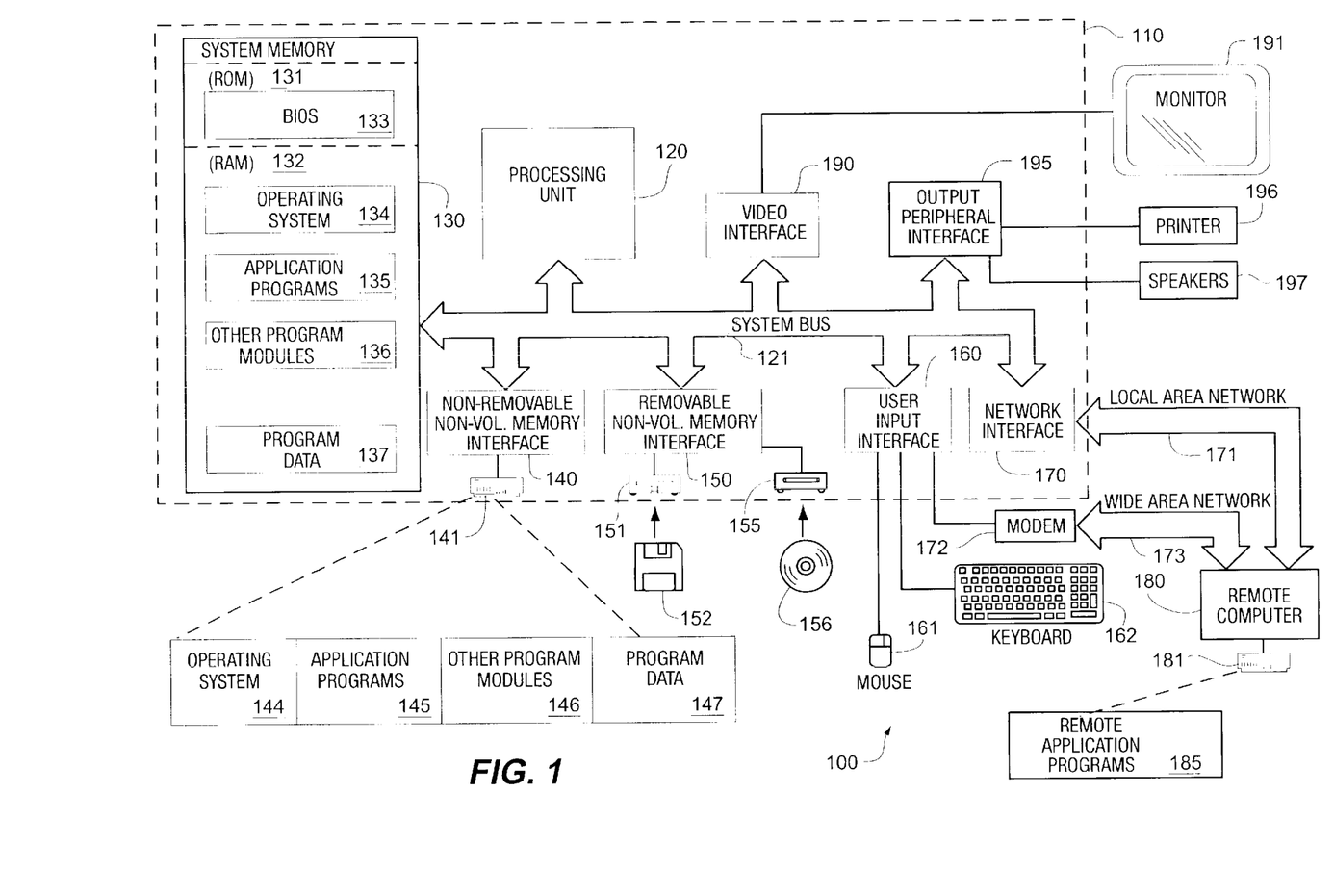
FIG. 1 is a block diagram generally illustrating an exemplary computer system which may support the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include volatile/nonvolatile and removable/non-removable media. By way of example, and not limitation, computer-readable media may include computer storage media and communications media. Computer storage media include volatile/nonvolatile and removable/non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs). Because the operating system 134 incorporates these services, developers of applications programs 135 need not redevelop code to use the services. Examples of APIs provided by operating systems such as Microsoft's "WINDOWS" are well known in the art.

The computer 110 may also include other removable/non-removable, volatile/nonvolatile computer storage media. By way of example only, FIG. 1 illustrates a hard disk interface 140 that reads from and writes to non-removable, nonvolatile magnetic media, a magnetic disk drive 151 that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Reporting an Incident

When a computer user calls on technical support to report a problem, also called an "incident," a support specialist tries to develop an understanding of the problem by collecting information stored on the user's computer. One aspect of the present invention is a set of procedures that facilitate the processes of reporting the incident and of collecting information pertinent to its resolution. Vendors providing technical support may use these procedures to develop applications, called "support channels," that run on the user's computer.

Figure 2:
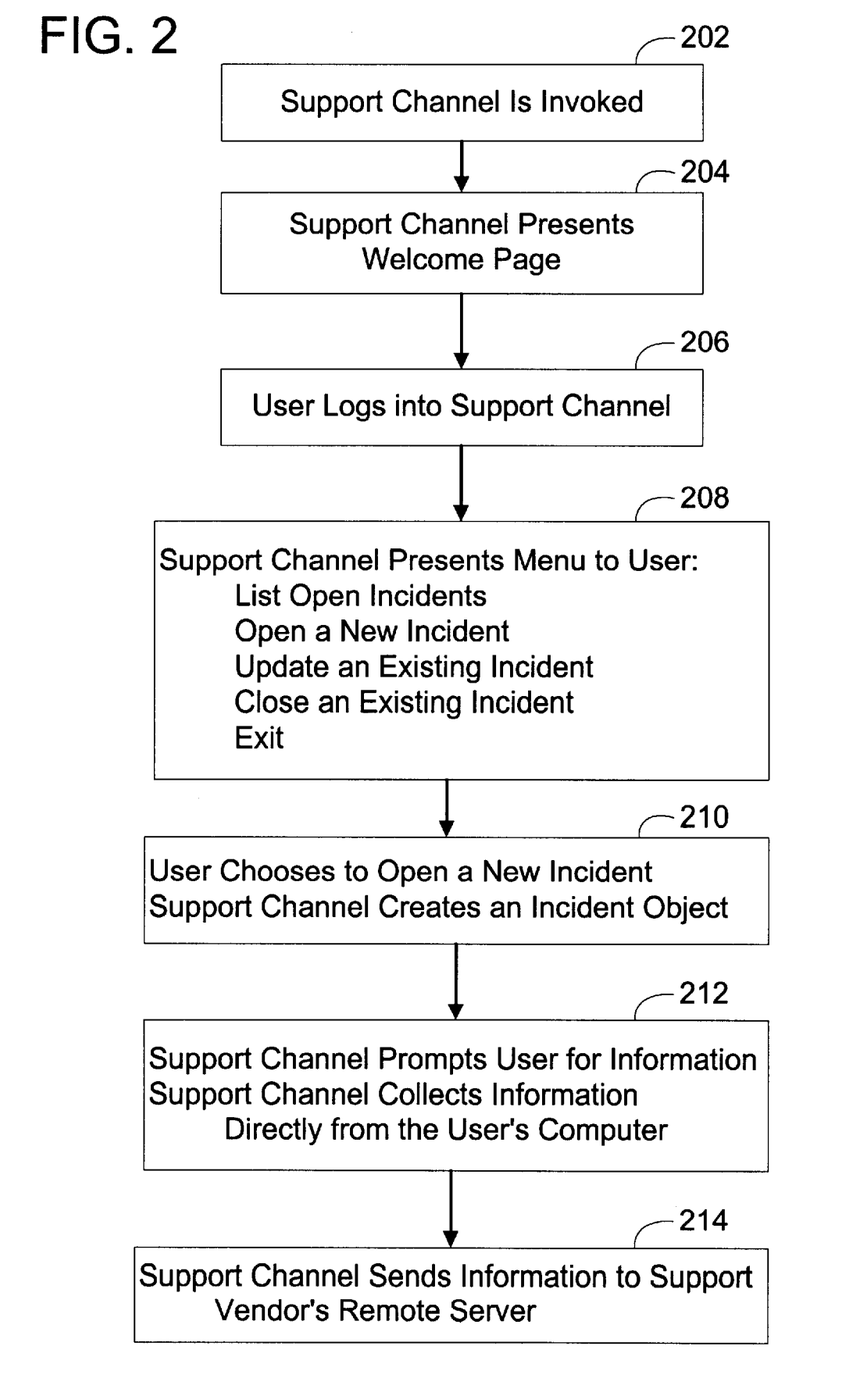
FIG. 2 is a flow diagram showing the steps typically taken when a user calls on technical support to report an incident.
Figure 3:
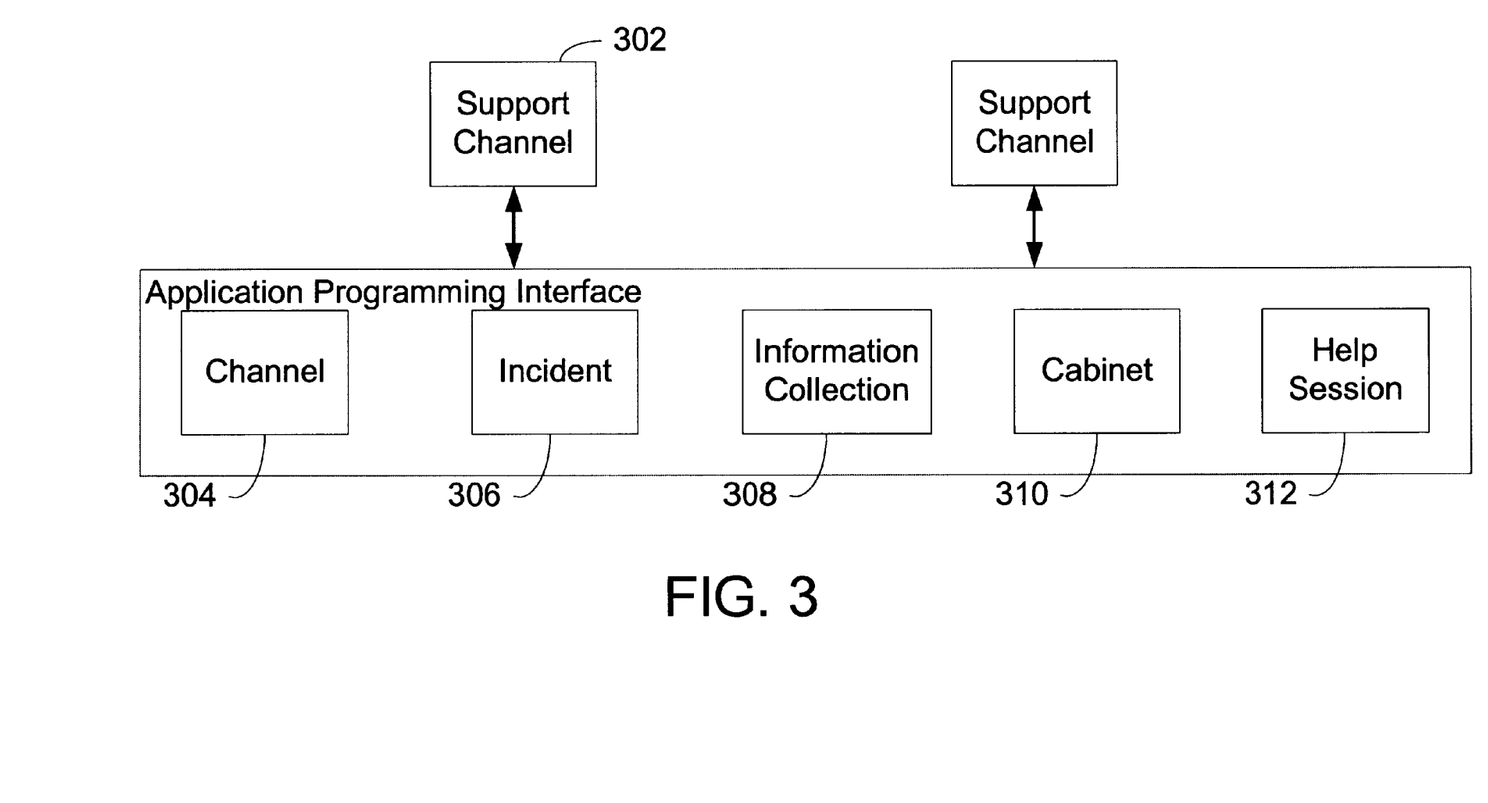
FIG. 3 is a block diagram illustrating an application programming interface according to one aspect of the present invention.

This section of the specification uses FIGS. 2 and 3 to illustrate how a support channel may operate. More details are given in later sections. FIG. 2 presents the steps typically taken when a user calls on technical support to report an incident, and FIG. 3 depicts one way in which the present invention may be implemented, as an API comprising software objects.

In step 202 of FIG. 2, the support channel appropriate to the incident is invoked. There may be a separate support channel for each application running on the user's computer, or each vendor may provide a support channel for all the products it provides, or there may be some other arrangement. For ease of operation, the support channels of the user's computer may be collected into one area, such as Microsoft's "WINDOWS" Help Center. Going to that area, the user may invoke the appropriate support channel based upon the specifics of the incident itself. In some cases, the application that caused the incident may be able to automatically invoke the appropriate support channel. In any case, a channel object (304 in FIG. 3) has already been created to track the incidents associated with the specific support channel 302.

In steps 204 and 206, the user identifies himself to the support channel 302. The support channel associates each incident with the user who reported it. This provides a level of security, allowing each user to see and to update only those incidents that he or she reported. Of course, system administrators may have special logins that provide them access to all incidents reported on the computer.

The user is presented with a menu of choices in step 208. Some of these choices are described in later sections. For the present description, the user chooses to open a new incident, step 210. The support channel 302 creates a new incident object 306, assigns it a unique incident tracking number, and associates the incident object with this user.

In step 212, the support channel 302 gathers information about the incident. The user is prompted for a description of what he or she was trying to do when the incident arose, what other applications may have been running at that time, how the incident manifested itself, and whatever other information the developer of the support channel believes may be useful in resolving the incident and may be readily obtained from the user. Other information is more readily and reliably obtained directly from the computer itself. The collection of this information is detailed below but in short, the support channel creates an information collection object 308 and tells that object what information may be useful to it. The information collection object than gathers the requested information and associates it with the incident object 306. In some implementations, the support channel may try to gather as much information as possible using automated means and only prompt the user for what it cannot determine.

In step 214, the support channel 302 packages the information collected from the user and from the computer into a cabinet object 310 and sends it off to a remote technical support center operated by the support vendor. The user exits the support channel 302 and continues on with his or her work.

Collecting Information

In the above section, the support channel 302 creates an information collection object 308 to get information about the incident directly from the user's computer. This section presents the operations of that object in more detail.

Figure 4:
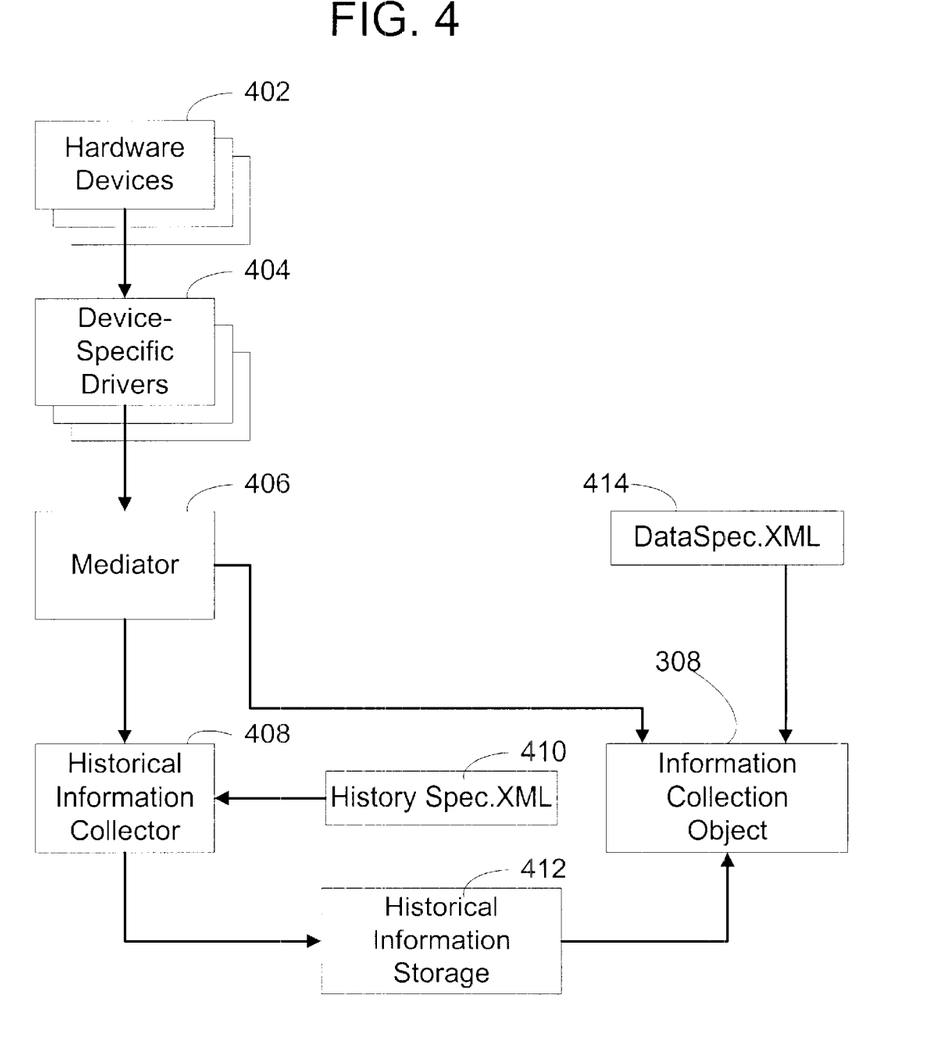
FIG. 4 is an information-flow diagram that shows how information about the status and history of a computer can be collected by a support channel.

FIG. 4 shows one way in which a computer may gather information about itself. The computer is made up of hardware devices 402 that may include a processing unit 120, hard disk interface 141, video interface 190, and the like. These devices report their status when requested to do so by their device-specific drivers 404. Generally speaking, each device-specific driver presents status via an interface unique to itself. To make operations more uniform, some operating systems provide a mechanism that mediates between those unique interfaces and presents to applications one unified interface. FIG. 4 shows an example of such a mediator 406. For more information on a specific mediator, see the document "Microsoft Windows Management Instrumentation and Simple Network Management Protocol," Microsoft Corporation 1998, attached as Appendix A. The following description assumes that something like this mediator exists. While such a mediator makes implementation easier, the present invention is not limited to those systems which provide it. In systems without a mediator, status information may be obtained by accessing the device-specific drivers 404 directly, in a manner well known in the art.

To gather historical information which may be useful in resolving support incidents, the historical information collector 408 runs periodically. Perhaps once a day, it takes a "snapshot" of the current status of the computer. To do this, it reads from a file, here called HistorySpec.xml 410, that tells it what information to gather. The historical information collector then requests the current value of that information from the mediator 406 (or directly from the device-specific drivers 404 if no mediator exists) and stores the information in the historical information storage area 412. Because storage space may be limited, older "snapshots" may be deleted to make room for new ones.

When an incident is reported, the information collection object 308 is sent to collect two types of information: a current snapshot and historical background. Directed by a file, here called DataSpec.xml 414, the information collection object takes a current snapshot of the state of the computer by requesting information from the mediator 406. It also reads historical information from the historical information storage area 412, information collected previously by the historical information collector 408. The support vendor can specify how much historical information the information collection object should gather.

Figure 5:
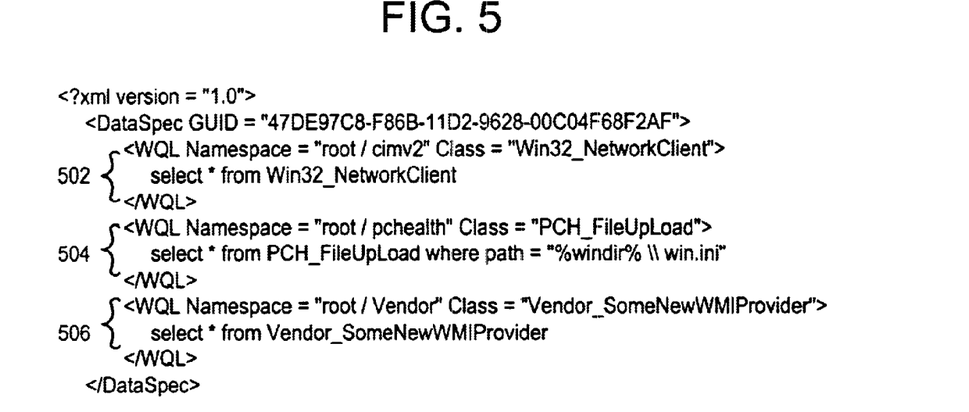
FIG. 5 is an example of a file used by the support channel to specify what information should be collected from the computer.

The files HistorySpec.xml 410 and DataSpec.xml 414 both specify what information to collect. In some implementations, they may follow the same format and indeed may even be the same file, although the support channel may write a DataSpec.xml file that limits or expands the amount of snapshot data collected as compared with what is collected by the historical information collector 408. FIG. 5 illustrates how a DataSpec.xml file may look if it were specified using the eXtensible Markup Language (XML). While XML is ideally suited to the task of supplying this specification information, the present invention does not depend upon the use of XML. For example, a database could easily present the same specification information.

First, a note on reading XML: An element begins with a start tag that encloses the element's name in angle brackets (e.g., <WQL>). The element ends with an end tag which also encloses the element name in angle brackets but this time the element name is preceded by a slash (e.g., </WQL>). An element contains everything between the start tag and the end tag. Elements may contain other elements.

The XML file in FIG. 5 contains three elements specifying information to collect. In this example, the elements are written in Windows Management Instrumentation Query Language (WQL), which language is described in the document "Using the WMI SDK" mentioned above. The WQL element 502 tells the information collection object 308 to collect all network client information. Element 504 asks that the contents of one file be stored as part of the snapshot. The file is named win.ini and is found in the directory pointed to by the system variable %windir% (which may have the value of, e.g., c:\Windows). Element 506 is an example of the flexibility provided by the mediator. The support vendor has added a new information provider, called Vendor_SomeNewWMIProvider, to the mediator. The information collection object is told to ask for status from that new information provider. Using this mechanism, the support vendor can collect customized information for problem resolution and does not have to depend upon whatever the operating system vendor decides to provide.

Because collecting information may take an appreciable amount of time, the information collection object 308 may provide progress information to the calling support channel. For example, that object may provide a method that, when invoked, estimates its time to completion. The support channel could display that estimated time so that the user knows that information collection is proceeding apace.

Communicating with a Remote Technical Support Center

Once the information collection object 308 has completed its task, all of the incident information is sent to a technical support center provided by the support vendor. That information includes the snapshot taken by the information collection object under the specification of the DataSpec.xml file 414, information from the historical information storage area 412, and information obtained directly from the user. According to one aspect of the present invention, a cabinet object 310 (FIG. 3) gathers all of this information, compresses it to minimize transport costs, and uses the computer's transport mechanism to send the information to the support vendor.

Updating an Incident

After initially reporting an incident but before it is finally resolved, the user may want to add information to the incident report. The menu in step 208 of FIG. 2 allows the user to do this. The user may report further occurrences of the incident or may describe attempts he or she has made to resolve the incident. In addition, the support channel may automatically update the incident report by recording which pages of help content the user visited during the current session of the support channel. This information may be useful to the support vendor in determining whether the user should be directed to a particular page of content. Also, the support vendor may use this information to judge the effectiveness of the help content. For example, if several users have network-related incidents and they consult a page describing a network troubleshooting application, but they still report the unresolved incidents to the support vendor, then perhaps the troubleshooter is not very useful or not very well described. In any event, the additional information is gathered in a help session object 312 and is associated with the incident object 306 by way of that object's unique tracking number. The information is also sent to the technical support center so that the user does not have to recount it and so that the support specialist does not have to repeat failed resolution attempts.

Resolving an Incident

What is done with the collected information once it arrives at the technical support center is peripheral to the present invention. Typically, the information is analyzed, either automatically or by technical support personnel, and a trial fix is developed. That fix may be downloaded to the user's computer and the user asked if he or she wants to install the fix. If the user does and the fix works, then the user can close the incident, an option indicated in the menu in step 208 of FIG. 2. Otherwise, the user may want to add more information to the incident report in the manner indicated in the section immediately preceding this one.

Tracking Incidents

A user may have open several support incidents at any one time and the invention may be used to help track those incidents. The channel object 304 associates each incident with a support vendor. The support channel presents the user with the option of displaying the status of all open incidents. For security reasons, however, each support channel may only display those incidents associated with that particular support vendor. Using the resulting list, the user may choose to update, close, or delete open incidents.

Deploying and Updating a Support Channel

Figure 6:
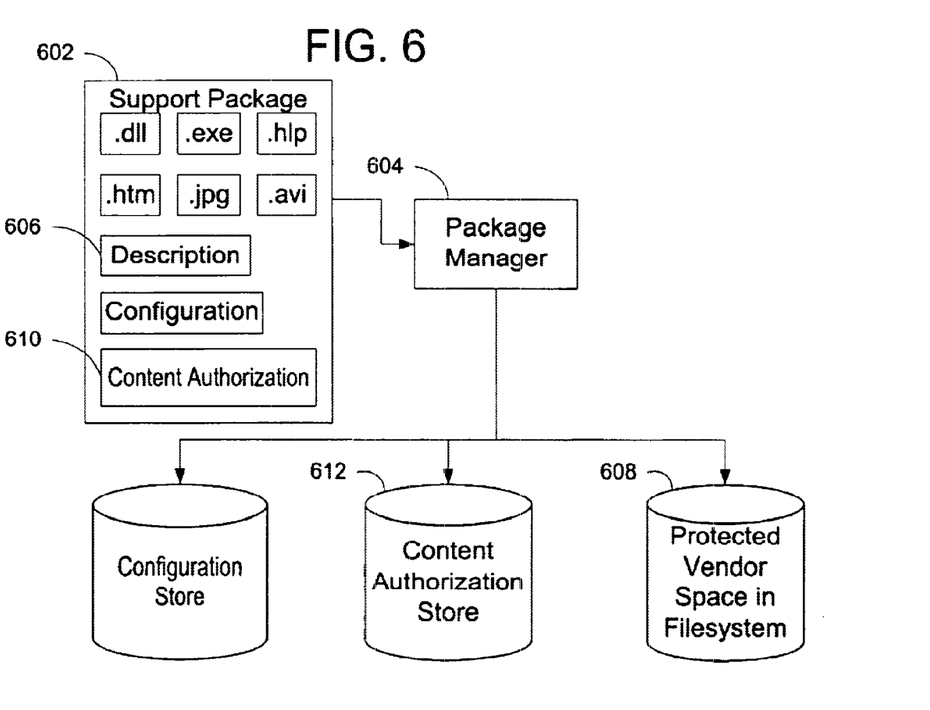
FIG. 6 is a block diagram showing how a support application can be deployed to a user's computer.

Potentially, a new support channel may be added to the user's computer whenever a new application is added. This can lead to security problems because each support channel needs to access critical system information but must be prevented from interfering with the work of support channels from other vendors. In order to allow this, the present invention allows for a package manager that lets support vendors send support channels and update the contents of those support channels in a secure and accountable manner. FIG. 6 shows one implementation of the package manager.

The support vendor packages the support channel and all related information files into a cabinet file 602 and sends the file to the package manager 604 running on the user's computer. The cabinet file must be signed with a security certificate from a reliable certification authority recognized by the package manager. That signature ensures that the cabinet file came from the support vendor named in it and the package manager uses the signature to hold the support vendor accountable for actions later performed by its support channel. Security signatures are well known in the art; for one example, see Microsoft's "AUTHENTICODE."

Within the support package cabinet file 602, the support vendor includes a description file 606 that directs the package manager 604 on how to install the package's contents. The package manager follows these directions and installs the resulting support channel in an area 608 protected from change by all but the owning support vendor. If the computer collects the support channels into one area, such as into Microsoft's "WINDOWS" Help Center, then the package manager adds the new support channel to that area.

For security's sake, the support vendor may register some parts of the support channel to run in a trusted mode. Only those parts are allowed to access the support services provided by the present invention. The registered parts are indicated in the content authorization file 610 within the support package 602 and are installed by the package manager 604 into a content authorization store 612 where they can be checked whenever one of the support services is invoked.

The same security mechanisms are used to update or delete support channels existing on the user's computer. The package manager 604 verifies the signature on the update to make sure that only the support vendor who owns a support channel can update it.

CONCLUSION

All of the references cited herein, including patents, patent applications, and publications, are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

We claim:

1. A method for managing information about a support incident on a computer, comprising:
    gathering information about the support incident;
    associating the support incident with a support channel; and
    collecting information from the computer relevant to diagnosing and resolving the support incident.

2. The method of claim 1 wherein the gathering includes prompting a user of the computer for information about the support incident.

3. The method of claim 2 wherein the associating is based, in part, on information gathered from the user of the computer.

4. The method of claim 1 wherein the support channel is associated with an application program.

5. The method of claim 1 wherein the support channel is associated with a support vendor.

6. The method of claim 1 wherein the information collected from the computer includes current status information and historical information.

7. The method of claim 1 further comprising:
    packaging the information gathered about the support incident and the information collected from the computer and sending them to a support vendor.

8. The method of claim 1 further comprising:
    updating the information gathered about the support incident with information about attempts at resolving the support incident.

9. The method of claim 8 further comprising:
    packaging the updated information gathered about the support incident and sending it to a support vendor.

10. A computer-readable medium having computer-executable instructions for performing the method of claim 1.

11. A system for managing information about a support incident on a computer comprising:
    an incident component that stores information for reporting and tracking the support incident;
    a channel component that associates the support incident with a support channel; and
    an information collection component for collecting information from the computer.

12. The system of claim 11 wherein the support channel is associated with an application program.

13. The system of claim 11 wherein the support channel is associated with a support vendor.

14. The system of claim 11 wherein the information collection component collects both current and historical information from the computer.

15. The system of claim 11 wherein the information collection component allows a support application to specify what information is collected.

16. The system of claim 11 wherein the information collection component collects information from a mediator.

17. The system of claim 11 further comprising:
    a cabinet component that packages and sends support information to a support vendor.

18. The system of claim 11 further comprising:
    a help session component that collects information about attempts at resolving the support incident.

19. The system of claim 11 wherein control information may be passed to the components by means of eXtensible Markup Language files.

20. A computer-readable medium containing computer-executable instructions that when executed provide the system of claim 11.

21. An application programming interface presented by the computer to support applications and comprising the components of the system of claim 11.

22. The application programming interface of claim 21 in which the components consist essentially of software objects.

23. A computer-readable medium having stored thereon a data structure, comprising:
    a first data field containing data representing an incident software object that stores information for reporting and tracking a support incident;
    a second data field containing data representing a channel software object that associates the support incident with a support channel; and
    a third data field containing data representing an information collection software object for collecting information from a computer.

24. The computer-readable medium of claim 23 having stored thereon a data structure, further comprising:
    a fourth data field containing data representing a cabinet software object that packages and sends support information to a support vendor.

25. The computer-readable medium of claim 23 having stored thereon a data structure, further comprising:
    a fifth data field containing data representing a help session software object that collects information about attempts at resolving the support incident.

* * * * *